(12) United States Patent
Osborne

(10) Patent No.: US 7,736,422 B2
(45) Date of Patent: Jun. 15, 2010

(54) CYCLONIC SEPARATION GRASSBAG APPARATUSES AND METHODS FOR MOWING MACHINES

(75) Inventor: Christopher M. Osborne, Efland, NC (US)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 12/021,462

(22) Filed: Jan. 29, 2008

(65) Prior Publication Data

US 2009/0188388 A1 Jul. 30, 2009

(51) Int. Cl.
*B01D 45/12* (2006.01)
(52) U.S. Cl. .............................. 95/271; 95/268; 55/337; 55/385.1; 55/385.3; 55/413; 55/414; 55/DIG. 3; 56/194; 56/202
(58) Field of Classification Search ................. 55/337, 55/385.1, 385.3, 413, 414, DIG. 3; 95/271, 95/268; 56/194, 202
See application file for complete search history.

(56) References Cited

U.S. PATENT DOCUMENTS

| | | | | |
|---|---|---|---|---|
| 2,134,978 A | * | 11/1938 | Alexander | 55/394 |
| 2,637,965 A | * | 5/1953 | Simpson et al. | 56/12.9 |
| 3,708,968 A | * | 1/1973 | Enters et al. | 56/16.5 |
| 3,953,184 A | * | 4/1976 | Stockford et al. | 55/458 |
| 3,971,198 A | | 7/1976 | Lane | |
| 3,987,606 A | | 10/1976 | Evans | |
| 4,081,947 A | * | 4/1978 | Szymanis | 56/13.3 |
| 4,158,280 A | * | 6/1979 | Thomas et al. | 56/202 |
| 4,426,830 A | * | 1/1984 | Tackett | 56/202 |
| 4,458,472 A | * | 7/1984 | Christopherson | 56/10.5 |
| 4,593,429 A | * | 6/1986 | Dyson | 15/353 |
| 4,631,909 A | | 12/1986 | McLane | |
| 4,665,684 A | | 5/1987 | DiPaolo | |
| 4,819,417 A | | 4/1989 | Bryant et al. | |
| 4,924,664 A | | 5/1990 | Hicks et al. | |
| 5,074,106 A | * | 12/1991 | Di Paolo | 56/202 |
| 5,778,648 A | | 7/1998 | Parkes et al. | |
| 5,848,521 A | * | 12/1998 | Kobayashi | 56/13.2 |
| 6,089,006 A | * | 7/2000 | Langford et al. | 56/202 |
| 6,658,833 B2 | * | 12/2003 | Dunning et al. | 56/202 |
| 6,705,068 B2 | | 3/2004 | Iida et al. | |
| 6,904,742 B2 | * | 6/2005 | Dunning et al. | 56/202 |
| 7,114,317 B2 | * | 10/2006 | Dunning et al. | 56/202 |

(Continued)

FOREIGN PATENT DOCUMENTS

JP 06303820 A * 11/1994

*Primary Examiner*—Jason M Greene
*Assistant Examiner*—Dung Bui
(74) *Attorney, Agent, or Firm*—Jenkins, Wilson, Taylor & Hunt, P.A.

(57) ABSTRACT

Apparatuses and methods are provided for removing dust particles from air circulating within a mowing machine, such as a lawn mowing machine, including a housing, a handle attached to the housing, a prime mover attached to the housing, and a grassbag employing a cyclonic separator. A grassbag apparatus can be provided that can include a grass clippings chamber for collecting blades of grass that have been cut and a dust collection chamber for removing and collecting dust-filled air from the air circulating within the lawn mowing machine. The dust collection chamber can include a cyclonic separator and a dust collection receptacle, wherein the cyclonic separator can be configured to remove dust particles from air circulating within the grassbag apparatus.

21 Claims, 6 Drawing Sheets

U.S. PATENT DOCUMENTS

| | | | |
|---|---|---|---|
| 7,354,466 B2 * | 4/2008 | Dunning et al. | 55/385.1 |
| 2003/0037522 A1 * | 2/2003 | Kobayashi et al. | 56/10.8 |
| 2006/0016167 A1 * | 1/2006 | Banowetz | 56/344 |
| 2007/0131195 A1 * | 6/2007 | Doring | 123/198 E |
| 2008/0104936 A1 * | 5/2008 | Kellermann | 55/357 |

* cited by examiner

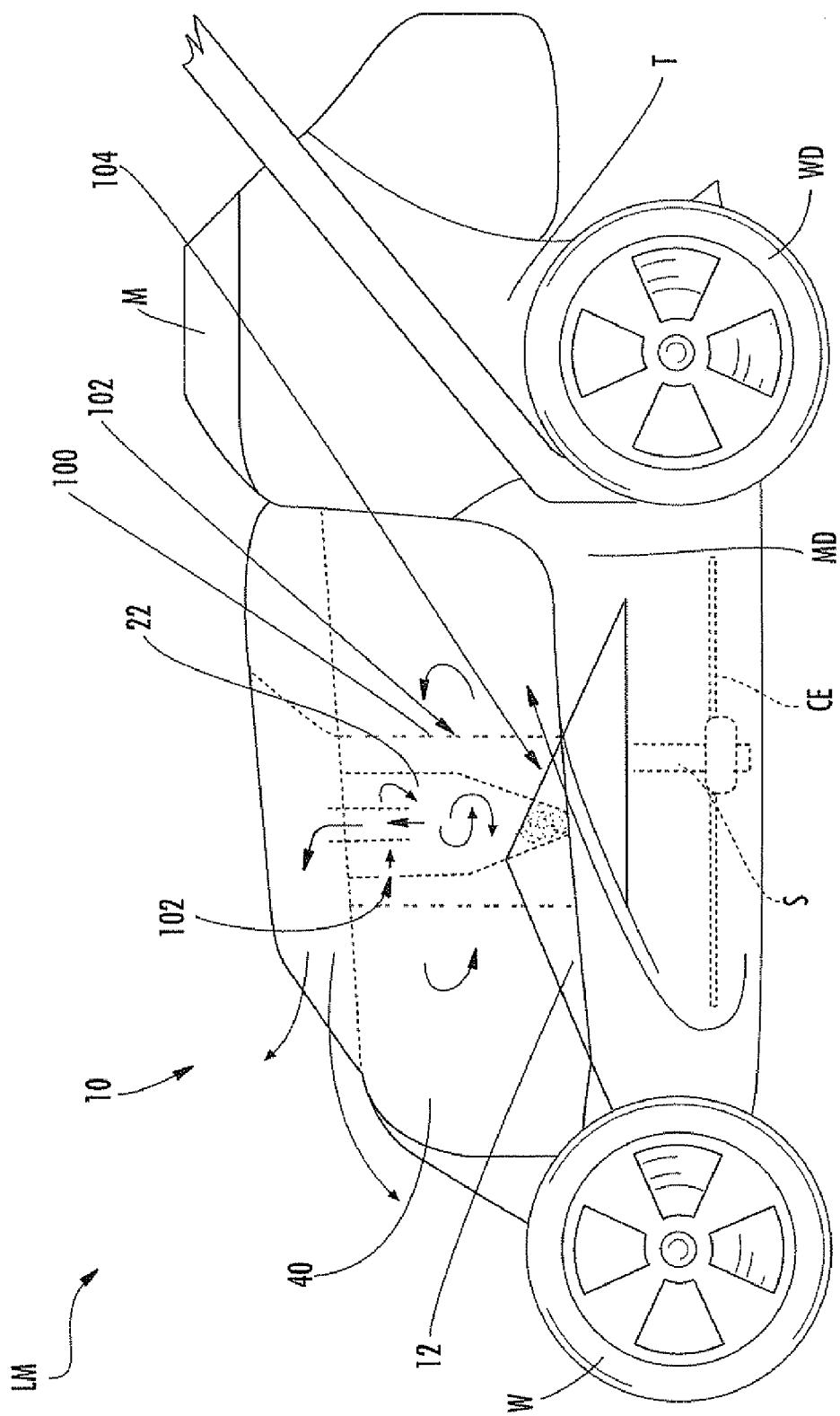

CYCLONIC SEPARATION GRASSBAG APPARATUSES AND METHODS FOR MOWING MACHINES

TECHNICAL FIELD

The subject matter disclosed herein relates generally to apparatuses and methods for removing dust particles and allergens from air circulating within a mowing machine. More particularly, the present subject matter relates to providing cyclonic separation within a grassbag used for collecting deposited grass clippings as described herein.

BACKGROUND

Lawn mowing machines often provide grassbags that are mounted to the mowing machines to collect grass clippings cut by a blade attached underneath the mowing machine. Collecting the grass clippings in a grassbag prevents the clippings from being discharged onto the ground surface, which can impede growth of healthy grass. After being cut by the blade, the grass clippings are swept away from the ground surface into the grassbag through a discharge chute by air currents generated by the high-speed rotation of the blade. A cutter housing of the mower normally includes the discharge chute for the grass clippings to exit from the cutter housing and enter the grassbag, wherein the clippings deposit and settle to the bottom. Typically, the grassbag is detachable from the mowing machine such that the bag can be emptied when it becomes full of grass clippings. Grassbags can be used on self-propelled walk-behind lawn mowers and riding lawn mowers.

A desirable feature of a grassbag is to maximize the air flow through a mowing machine and grassbag such that grass clippings are separated from pressurized air flow and will deposit on the bottom of the grassbag. Such a feature can be obtained by using a material for the grassbag that is pervious to air but generally impervious to grass. The air exiting the grassbag contains dust particles and allergens that can cause discomfort to a user during operation. Furthermore, when the user removes the grassbag from the lawn mower, dust particles and allergens remaining in the grassbag can dissipate into the air causing discomfort for the user. The same occurs when the user empties the grassbag by dumping the grass clippings onto the ground surface.

Therefore, it would advantageous to employ cyclonic separation in the grassbag to remove dust particles and allergens from the air circulating within the grassbag and lawn mowing machine. The cyclonic separation can facilitate the collection of dust particles in a receptacle that can be emptied, while also transporting air from within the lawn mowing machine to the outside environment that is free of dust and allergens, while further maintaining a maximized air flow throughout the system.

SUMMARY

According to the present disclosure, novel cyclonic separation grassbag apparatuses and methods are provided for removing dust particles and allergens from air exiting the mowing machine while further maximizing air flow therethrough.

It is therefore an object of the present disclosure to provide cyclonic separation grassbag apparatuses and methods for removing dust particles and allergens from air exiting the mowing machine while further maximizing air flow therethrough. An object having been stated hereinabove, and which is achieved in whole or in part by the subject matter disclosed herein, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures in which:

FIG. 6 illustrates a side elevation view of a lower section of a self-propelled mowing machine having a grassbag apparatus positioned above a cutting device of the self-propelled mowing machine.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still a further embodiment It is intended that the present subject matter cover such modifications and variations.

Figure 1:
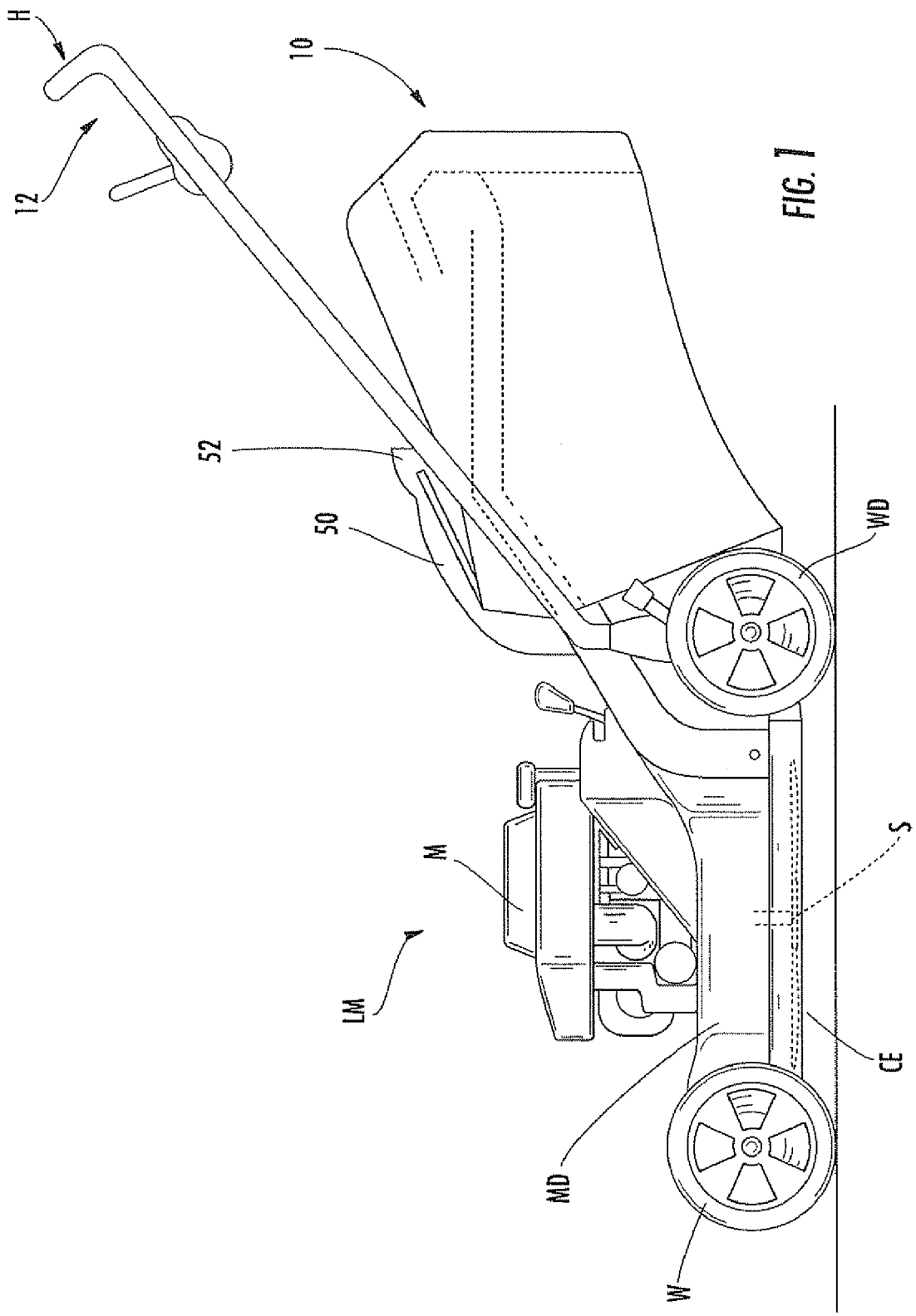
FIG. 1 illustrates a side elevation view of a self-propelled mowing machine including a grassbag apparatus provided in accordance with the subject matter disclosed herein.

Referring now to FIG. 1, a self-propelled lawn mowing machine generally designated LM is illustrated by way of example. Lawnmower LM can comprise any suitable configuration generally known to persons skilled in the art or later developed In one aspect, lawnmower LM can comprise a housing such as a mower deck MD, which can include a front portion, a rear portion, an upper exterior portion, and a lower, interior portion. A handle generally designated H can be coupled to the rear portion of mower deck MD by any suitable means, and can extend upwardly therefrom at an angle appropriate for comfortable grasping and manipulation by an operator. Handle H provides an area to be gripped by an operator and includes a proximal end section, generally designated 12, which can be the section farthest away from the main operational components of lawn mower LM, such as prime mover or motor M and transmission T (not shown). In one aspect, proximal end section 12 of handle H can be generally U-shaped.

Mower deck MD can be supported for rolling movement over a surface by a set of wheels and can include one or more idle (non-driving) wheels, such as wheels W, and one or more driving wheels, such as driving wheels WD. There is no limitation as to which one or more of wheels W functions as driving wheel or wheels WD, although typically the rearmost wheel or wheels serve this function.

Lawnmower LM can also include a powered drive system or assembly. The powered drive system can include any suitable prime mover such as motor M, which can be an electric motor or an internal combustion engine. The drive system can further include a transmission T (not shown). Both motor M and transmission T can be mounted to the upper exterior portion of mower deck MD in a suitable manner. As shown in FIG. 1, an output shaft S (shown in phantom) of motor M can rotate a suitable cutting element CE which can be any suitable cutting mechanism such as a blade or blades or disposed within the interior portion of mower deck MD. Motor M also can transfer power to driving wheels WD through transmission T in any suitable manner, thereby rendering lawnmower LM self-propelled in response to control by an operator. Torque from output shaft S can, for example, be transferred to an input shaft (not shown) of transmission T via an endless belt (not shown). Torque from the input shaft can be transferred to an additional output shaft (e.g., an axle or half-shaft coupled to respective driving wheels WD) through an appropriate reducing or transfer means such as a gear set (not shown). Transmission T can be a variable-speed transmission, and can more particularly be a continuously variable-speed transmission.

The different types, structures, and functions of components of lawnmower LM in addition to those described above are known to persons skilled in the art, and therefore are not further described.

As illustrated in FIG. 1, a grassbag apparatus generally designated 10 can be attached or mounted to lawnmower LM. Grassbag apparatus 10 can be attached or mounted to the rear portion of lawnmower is any suitable manner including providing hooks or similar attachment mechanisms that are known to those of skill in the art. Also, grassbag apparatus 10 can be attached or mounted at any position to lawnmower LM. Grassbag apparatus 10 can be a rigid structure having a wire frame with a cover material attached thereto or any other suitable structure and materials such that the grassbag apparatus 10 can remain rigid while attached to lawnmower LM. Grassbag apparatus 10 can be constructed of a material impervious to air such as, for example, a plastic material or any other suitable material. Thus, air circulating within grassbag apparatus 10 can be contained within grassbag apparatus 10 such that a proper cyclonic airflow function can be effectuated.

As can be appreciated by persons skilled in the art, grassbag apparatus 10 can collect grass clippings cut by cutting element CE that are discharged from mower deck MD. When an operator is operating or manipulating lawnmower LM in an intended matter, cutting element CE can cut the grass such that the grass clippings are transported out of mowing deck MD into grassbag apparatus 10 via the air circulating throughout mower deck MD and grassbag apparatus 10. In some aspects and as known to those of skill in the art, grassbag apparatus 10 is mountable to lawnmower LM such that grassbag apparatus 10 can be removed for emptying the collected grass clippings. Also, grassbag apparatus 10 can be designed to increase air circulation throughout lawnmower LM such that the clippings are effectively and continuously swept into grassbag apparatus 10.

Figure 2:
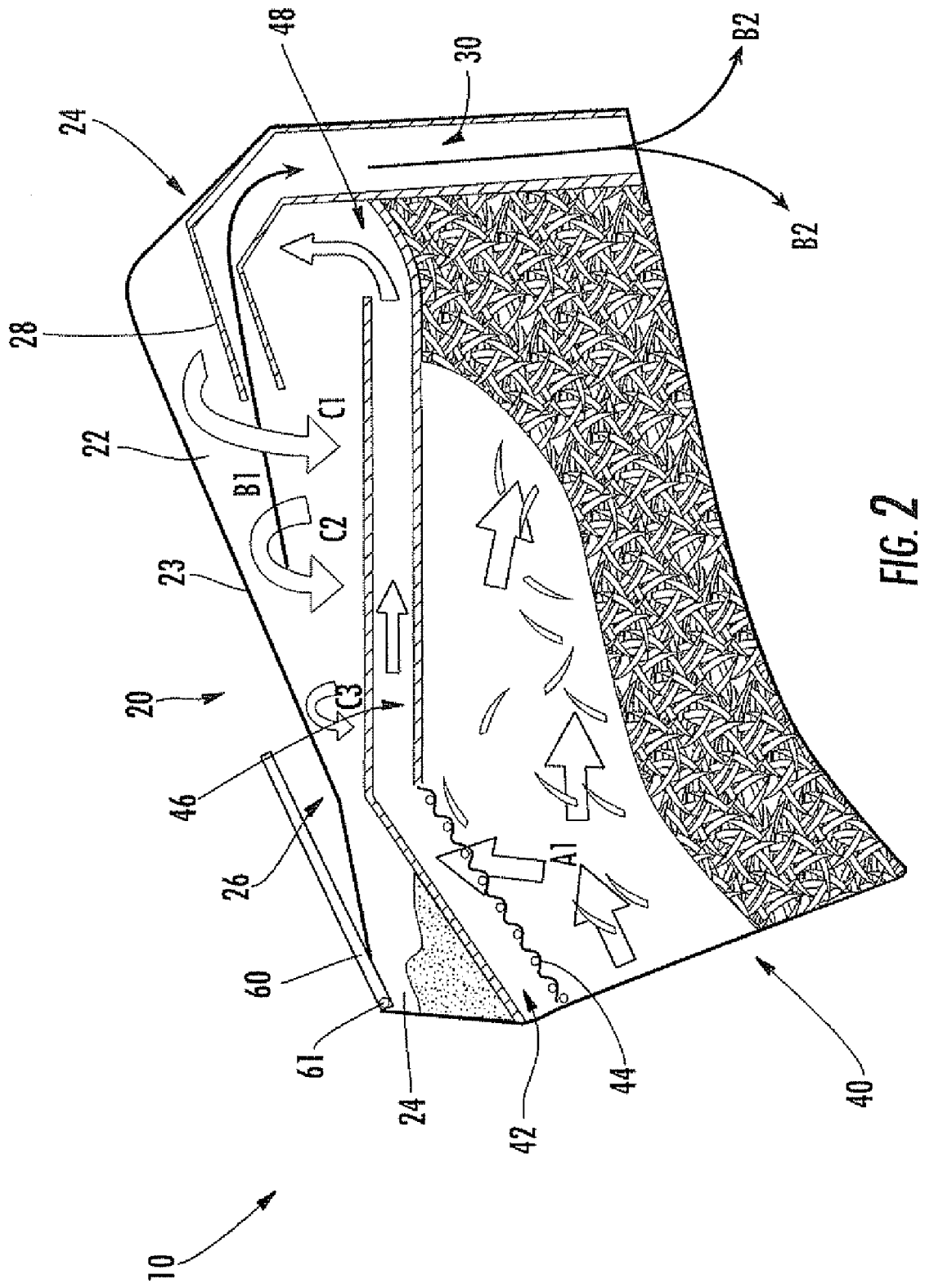
FIG. 2 illustrates a cross-sectional side view of an embodiment of a grassbag apparatus provided in accordance with the subject matter disclosed herein.
Figure 3:
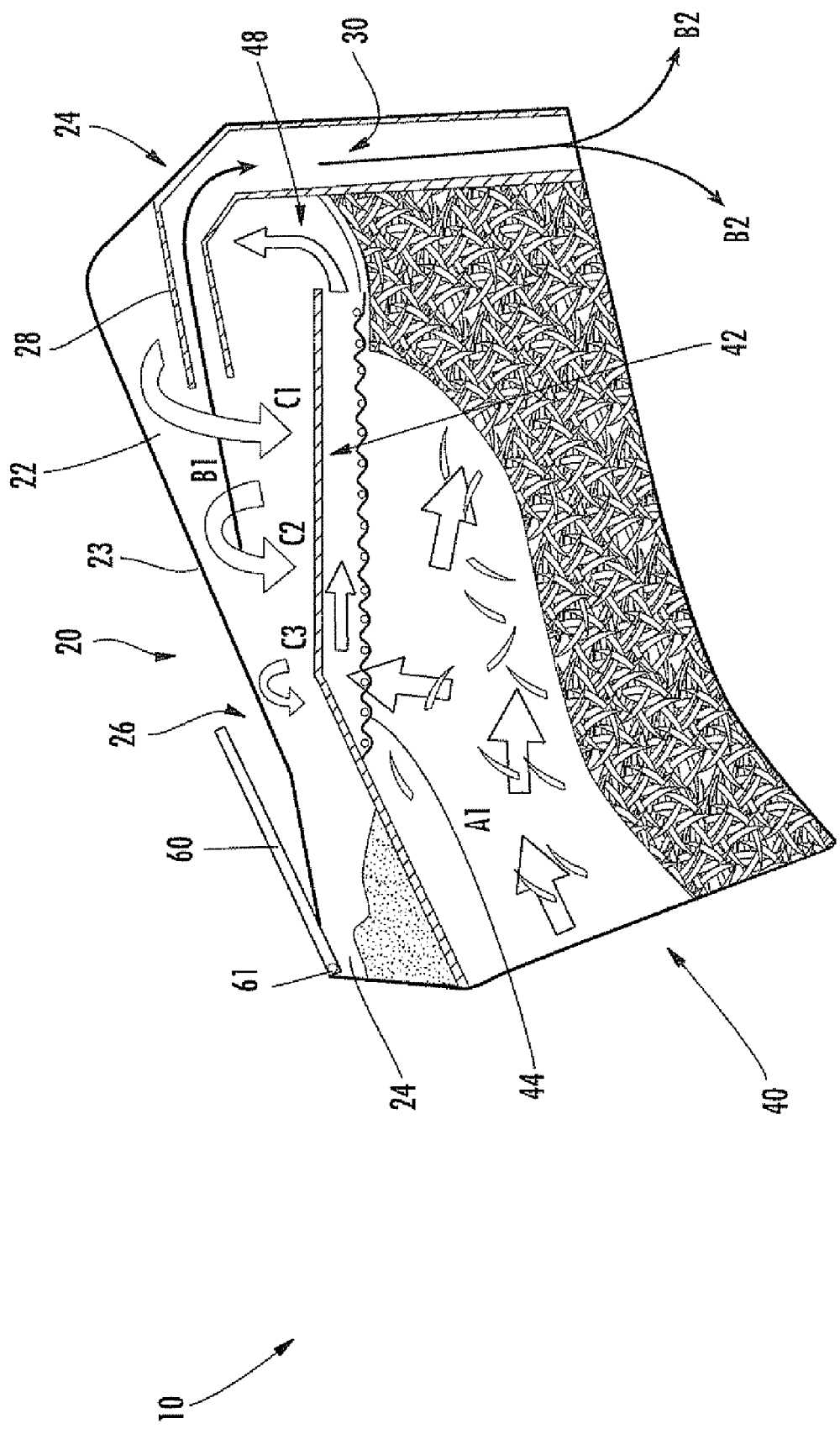
FIG. 3 illustrates a cross-sectional side view of another embodiment of a grassbag apparatus provided in accordance with the subject matter disclosed herein.
Figure 4:
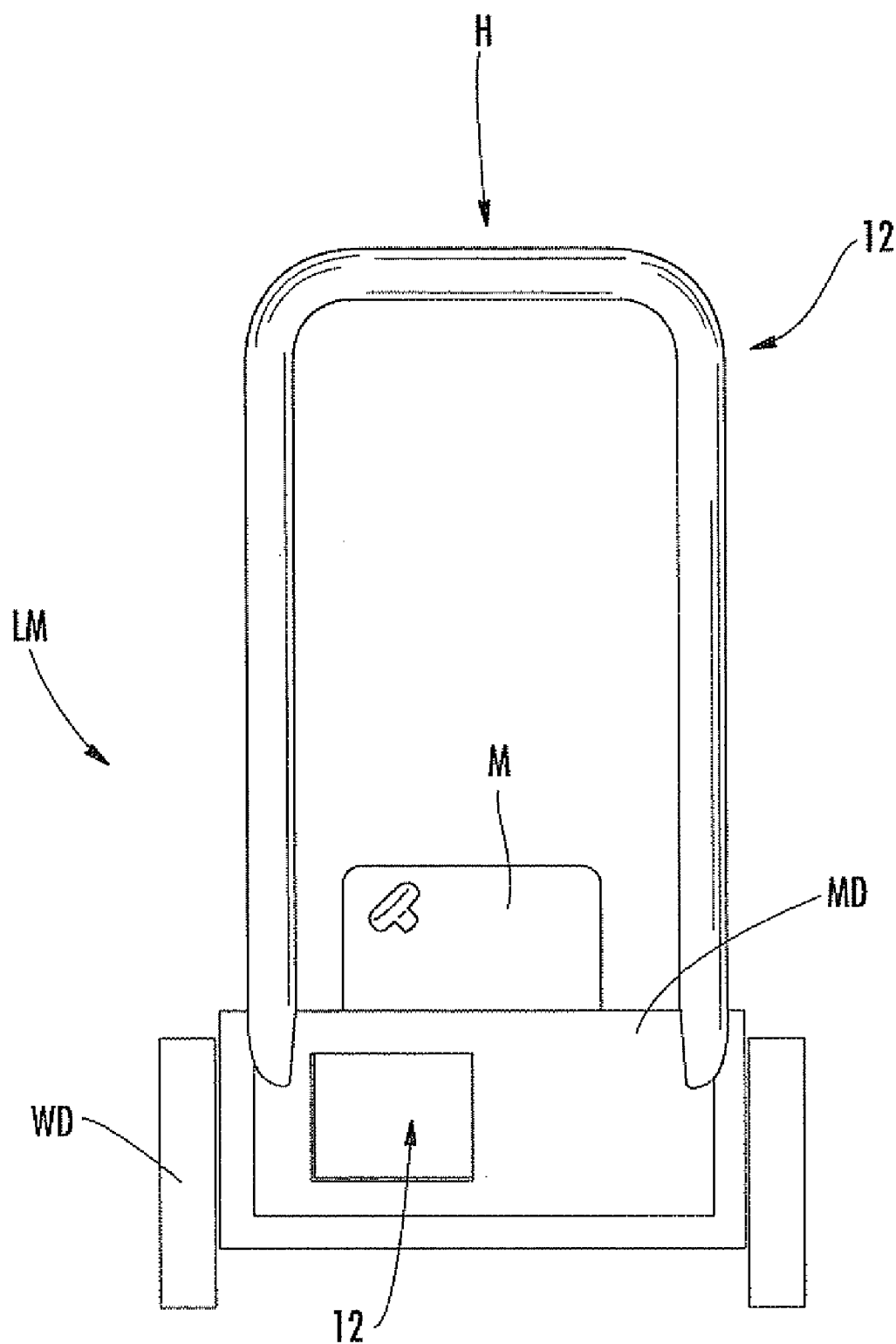
FIG. 4 illustrates a rear elevation view of a self-propelled mowing machine without a grassbag apparatus.

Referring now to FIGS. 2 and 3, grassbag apparatus 10 can include a dust collection chamber generally designated 20 and a grass clippings chamber generally designated 40. Grassbag apparatus 10 can be configured to facilitate a cyclonic airflow that can separate dust particles from dust-filled air generated during use of lawnmower LM, which can result in cleaner air that is free of dust and allergens exiting grassbag apparatus 10. When dust-filled air and grass clippings enter grassbag apparatus 10 via a discharge chute generally designated 12 (FIG. 4), the heavy grass clippings can be directed into grass clippings chamber 40, which can be located in the lower portion of grassbag apparatus 10. Dust collection chamber 20 can be positioned above grass clippings chamber 40. Alternatively, dust collection chamber 20 and grass clippings chamber 40 can be positioned laterally with respect to each other or in any other manner suitable for effectuating a cyclonic airflow throughout grassbag apparatus 10.

Grassbag apparatus 10 can also include an inlet generally designated 42 positioned at the top of grass clippings chamber 40. Inlet 42 can be any suitable shape and size and is preferably shaped to maximize airflow exiting grass clippings chamber 40. Simultaneously to grass clippings entering grass clippings chamber 40, dust-filled air can be pulled up by air circulating within lawnmower LM into inlet 42. Inlet 42 can be covered with a debris filter 44 to prevent grass clippings and larger debris from exiting grass clippings chamber 40 and entering inlet 42. Debris filter 44 can be of any suitable shape and size and can be constructed from any suitable material including metals, polymers, ceramics and other durable materials.

Referring to FIG. 2, inlet 42 can be connected to a channel generally designated 46 that can deliver the dust-filled air to a cyclonic separator 22 at an outlet generally designated 48 connected to channel 46 at the end that is opposite inlet 42. Channel 46 can extend from inlet 42 to outlet 48 and can be any suitable shape and size to facilitate maximum airflow from grass clippings chamber 40 to cyclonic separator 22. Referring to FIG. 3, inlet 42 and debris filter 44 can be configured such that inlet 42 directly communicates with outlet 48 without the need for channel 46.

Referring to FIGS. 2 and 3, grass clippings chamber 40 can be configured with a rigid structure having a durable covering for containing grass clippings. Grass clippings chamber 40 can be constructed of a non-breathable material such as, for example, a durable and rigid plastic material or any other suitable material and structure. In some aspects, grass clippings chamber 40 can be configured to effectuate a strong airflow to transport air clippings from mowing deck MD into grass clippings chamber 40. The airflow in grass clippings chamber 40 is depicted by the series of arrows A1 showing a path from mowing deck MD into grass clippings chamber 40. Also depicted by a series of arrows B1 is the path of the dust filled air exiting grass clippings chamber 40 through inlet 42 to cyclonic separator 22.

Figure 5:
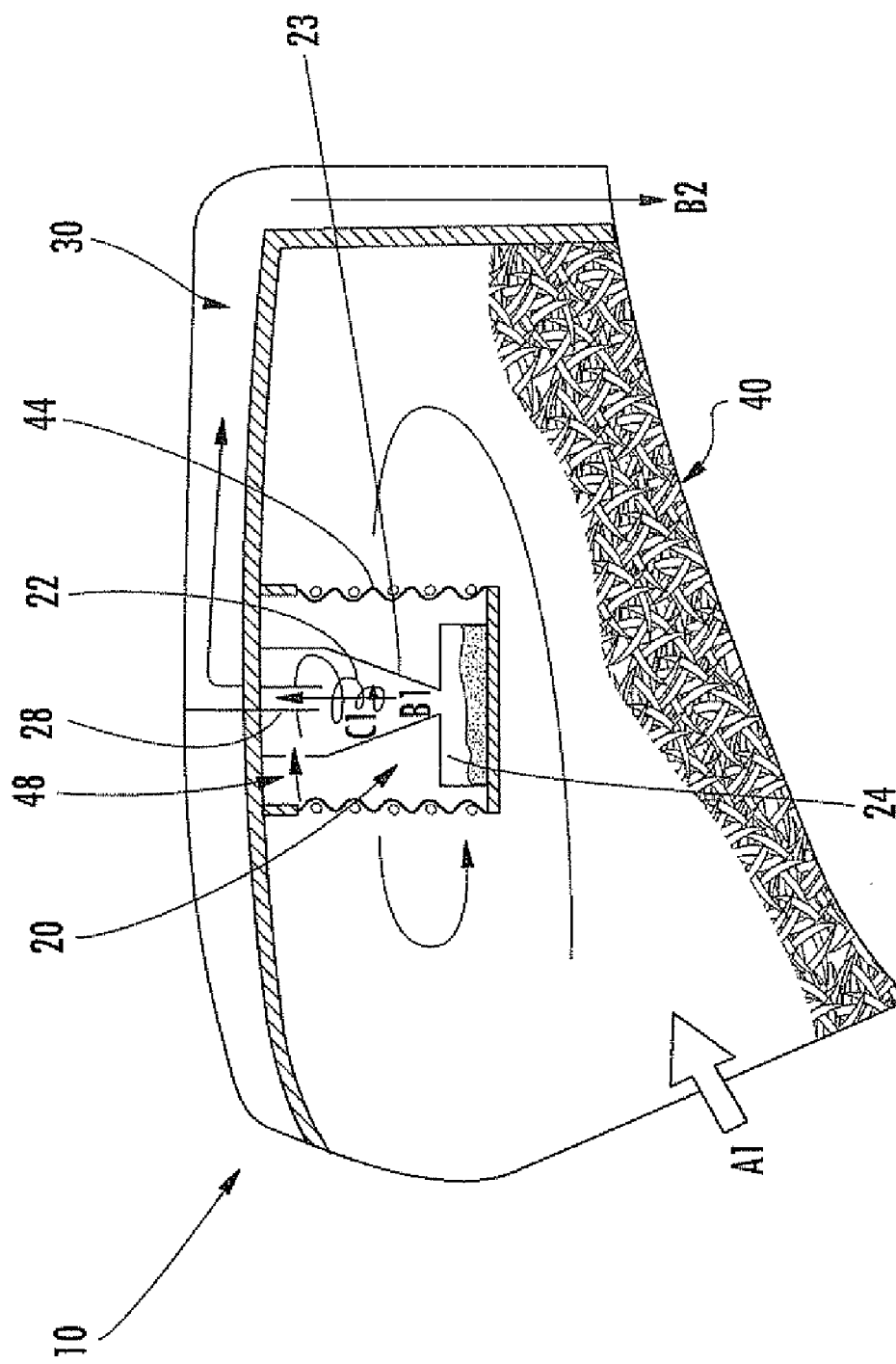
FIG. 5 illustrates a cross-sectional view of yet another embodiment of a grassbag apparatus provided in accordance with the subject matter disclosed herein.

Dust collection chamber 20 can be operatively configured to grass clippings chamber 40 and can include cyclonic separator 22 and a dust collection receptacle 24. Cyclonic separator 22 can have a body 23 that can be shaped substantially conical. Also, body 23 can be substantially cylindrical with a conical end portion 25, as shown in FIGS. 5 and 6. Cyclonic separator 22 can further have a first end generally designated 24 positioned proximate the rear of grass-bag apparatus 10 and a second end generally designated 26 proximate the front of grass-bag apparatus 10. Cyclonic separator 22 can be positioned substantially horizontal or vertical such that the cyclonic airflow is substantially horizontal or vertical, respectively, or it can be positioned in any orientation. When positioned above channel 46, cyclonic separator 22 can be attached to dust collection receptacle 24 at second end 26. Dust collection receptacle 24 can be removable for dumping dust particle build-up. Centered at and extending into first end 24 of cyclonic separator 22, a baffle 28 can generate the cyclonic airflow. Baffle 28 can be substantially cylindrical and can be connected to a clean air passage generally designated 30 that facilitates removal of clean air exiting grassbag apparatus 10.

When dust-filled air enters cyclonic separator 22, the air circulates in a spiral pattern as depicted by a series of arrows C1 due to baffle 28 from first end 24 to second end 26. Subsequently, the air can exit cyclonic separator 22 in a straight stream B1 through the center of the cyclonic airflow and out baffle 28 and clean air passage 30 as indicated by arrow B2. The dust particles in the dust-filled air have too much inertia to follow the tight curve of the cyclonic air stream and, instead, strike the walls of cyclonic separator 22. The dust particles then fall to second end 26 of the cyclonic separator 22 and into dust collection receptacle 24. The air, now substantially free of dust and allergens, exits dust collection chamber 20 through clean air passage 30. Cyclonic separator 22 can be advantageously used to remove dust particles from the air within grass-bag apparatus 10 instead of a filter, which has a tendency to clog and can impede the flow of air circulation throughout grass-bag apparatus 10, leading to undesirable effects such as preventing grass clippings from being drawn into grass clippings chamber 40 and promoting collection of dust particle build-up.

The airflow in cyclonic separator 22 is depicted by the series of arrows showing a helical cyclone motion going away from baffle 28 with a concentric flowing exhaust through clean air passage 30. The dust-filled air travels down the helical path and strikes the walls of cyclonic separator. When the dust particles strike the walls, frictional force causes them to precipitate downwardly to be collected in dust collection receptacle 24. Dust collection receptacle 24 can include a lid 60 that can open or pivot with a pivoting mechanism such as a hinge 61 such that the dust particles collected can be dumped and removed from grassbag apparatus 10.

Grassbag apparatus 10 can be mountable to existing lawnmowers without the need for modification. Also, grassbag apparatus 10 can be structured such that dust collection chamber 20 and grass clippings chamber 40 are positioned laterally.

As shown in FIG. 1, a flap 50 can be attached to lawnmower LM on the top of mowing deck MD. Flap 50 can include a biasing mechanism such that flap 50 can be biased in a downward position such that flap 50 covers a portion of grassbag apparatus 10. Flap 50 can include a lip portion 52 so user can lift flap 50 to permit grassbag apparatus 10 to be removed from lawnmower LM for emptying.

In another aspect, as shown in FIG. 5, cyclonic separator 22 can be positioned vertically within grassbag apparatus 10. Furthermore, cyclonic separator 22 can be centrally positioned within grassbag apparatus 10. Dust collection chamber 20 can be positioned centrally and vertically within grass clippings chamber 40. Dust collection receptacle 24 can be adapted to cyclonic separator 22 to collect dust particles removed from the circulating air by cyclonic separator 22.

With further reference to FIG. 5, grass clippings can enter grass clippings chamber 40 in direction A1 and can circulate therewithin in a circular pattern around duct collection chamber 20, thereby causing the grass clippings to contact dust collection chamber 20 and settle to the bottom of grass clippings chamber 40. The grass clippings can be prevented from entering the dust collection chamber due to debris filter 44. Dust filled air, however, can enter dust collection chamber 20 and thereby can enter cyclonic separator 22 at outlet 48, thereby encountering baffle 28 that can cause the air to circulate in a downward spiral in direction C1 and then exit cyclonic separator 22 in direction B1. The air, now substantially free of dust and allergens, can exit grassbag apparatus 10 via clean air passage 30 in direction B2.

In another aspect, grassbag apparatus 10 can be positioned directly above mower deck MD and cutting element CE. Referring now to FIG. 6, grassbag apparatus 10 can be positioned directly above mower deck MD while motor M and transmission T are positioned at the rear of lawnmower LM, which can also provide improved traction by loading additional weight on driving wheels WD. Thus, motor M can rotate output shaft S via an endless belt (not shown) or gear set (not shown) configuration to facilitate rotation of cutting element CE. In this aspect, grassbag apparatus 10 can be configured such that cyclonic separator 22 is centrally positioned therewithin.

With further reference to FIG. 6, cyclonic separator 22 can be surrounded by a second baffle 100 that can define dust collection chamber 20. Second baffle 100 can be substantially cylindrical and can include a plurality of slits generally designated 102 for permitting dust filled air to enter cyclonic separator 22 while preventing grass clippings from entering therein. Furthermore, discharge chute 12 can be defined by the top of mower deck MD and a corresponding passage generally designated 104 can be defined by grass clippings chamber 40 such that grass clippings can be pulled up through and exit mower deck MD and enter into grass clippings chamber 40.

Still in reference to FIG. 6, grassbag apparatus 10 can be constructed of a transparent or translucent material to permit a user to know when grass clippings chamber 40 is full and needs emptying Also, grassbag apparatus 10 can be container-like such that grassbag apparatus 10 can be constructed of a rigid plastic that is durable and can withstand positioning directly above mower deck MD. Grassbag apparatus 10 can be configured to tilt forward for emptying grass clippings. Alternatively, grassbag apparatus 10 can be configured such that grass bag apparatus 10 can be completely detached and removed from lawnmower LM for emptying grass clippings.

In use, grass clippings are cut by cutting element CE and fluidly transported into grass clippings chamber 40. Inside grass clippings chamber 40, the grass clippings can circulate about and contact second baffle 100 and can contact the walls of grass clippings chamber 40 as well, thereby causing the grass clippings to settle and accumulate at the bottom of grass clippings chamber 40. Dust-filled air circulating about second cylindrical baffle 100 can enter within dust collection chamber 20 and second baffle 100 through slits 102. Then, dust-filled air circulating within second baffle 100 can enter cyclonic separator 22 at inlet 42. Upon entering cyclonic separator 22, dust can be removed from the dust-filled air as described hereinabove, and substantially dust-free air exits cyclonic separator 22 through the center of the cyclonic airflow and out through baffle 28 and outlet 48.

In other aspects, grassbag apparatus 10 can be configured to include multiple chambers with each including cyclonic separator 22. That is, cyclonic separator 22 used for removing grass clippings from the circulating air can be positioned in a chamber separate from another cyclonic separator 22 used for removing dust and allergens from dust-filled air. Thus, the grass clippings would first be removed in a first chamber (not shown) near mower deck MD and the dust would be removed in a second chamber (not shown) up the line from the first chamber. Alternatively, multiple chambers can be used to more completely remove dust and allergens from the air exiting grassbag apparatus 10. For example, two cyclonic separators 22 can be employed in separate chambers such that the air flows through one cyclonic separator 22 and then flows through a second cyclonic separator 22 to more effectively remove dust particles from the air within lawnmower LM.

Furthermore, grassbag apparatus 10 can include any configuration of grass clippings chamber 40, cyclonic separator 22, and dust collection receptacle 24. That is, cyclonic separator can be configured in any orientation (e.g., vertical, horizontal, angled) such that a proper cyclonic airflow can be achieved, wherein the dust can be substantially removed from the circulating air within cyclonic separator 22. Also, grassbag apparatus 10 can be configured such that grass clippings chamber 40 is positioned to accumulated grass clippings discharged from mower deck MD.

A fan (not shown) can be used to assist with generating the airflow required for a proper cyclone function. The fan can be attached to output shaft S of motor M to rotate with in mower deck MD. The fan can be positioned in any suitable location such as above cutting element CE such that an adequate airflow or circulation is provided to transport the grass clippings into grass clippings chamber 40, where the grass clippings are deposited, and then transport the air free of clippings to cyclonic separator 22 for removal of dust particles and allergens from the air. As known to those with skill in the art, the fan can have propeller-like blades or any other suitable design to create a desirable cyclonic airflow.

In one aspect, a fan can be used that is mechanically operable and does not require the use of output shaft S for operation. In this aspect, a fan can be positioned within mower deck MD between discharge chute 12 and cutting element CE such that the fan can draw air containing grass clippings and dust from mower deck MD to grass clippings chamber 40 and further facilitating air flow to cyclonic separator 22.

It will be understood that various details of the disclosed subject matter may be changed without departing from the scope of the disclosed subject matter. Furthermore, the foregoing description is for the purpose of illustration only, and not for the purpose of limitation.

What is claimed is:

1. A lawnmower grassbag apparatus for collecting grass clippings discharged from the lawnmower, the apparatus comprising:
a grass clippings chamber for collecting grass clippings;
a dust collection chamber having a cyclonic separator in communication with the grass clippings chamber; a channel having a first end and a second end and the channel connecting the grass clippings chamber to the cyclonic separator to allow air to travel from the grass clippings chamber to the cyclonic separator; a debris screen positioned at the channel first end to prevent grass clippings from entering the channel; and
wherein the cyclonic separator is configured to remove dust particles from air circulating within the dust collection chamber.

2. The lawnmower grassbag apparatus of claim 1 further comprising:
an inlet connecting the grass clippings chamber to the channel first end and an outlet connecting the channel second end to the cyclonic separator.

3. The lawnmower grassbag apparatus of claim 1 wherein the cyclonic separator is substantially cylindrical.

4. The lawnmower grassbag apparatus of claim 1 wherein the cyclonic separator is substantially conical.

5. The lawnmower grassbag apparatus of claim 1 wherein the cyclonic separator comprises a baffle for effectuating a cyclonic airflow.

6. The lawnmower grassbag apparatus of claim 1 wherein the grass clippings chamber is positioned lateral to the cyclonic separator.

7. The lawnmower grassbag arrangement of claim 1 further comprising:
a dust collection receptacle in communication with the cyclonic separator to collect dust particles removed from air within the dust collection chamber by the cyclonic separator.

8. The lawnmower grassbag apparatus of claim 7 wherein the dust collection receptacle is detachable from the cyclonic separator.

9. A self-propelled mowing machine comprising:
a mower housing having a prime mover attached to the mower housing for propelling the mowing machine and the mower housing further having a mower deck for housing a cutting element;
a handle attached to the mower housing; and
a grassbag apparatus mountable to the mower housing and comprising:
a grass clippings chamber for collecting grass clippings;
a dust collection chamber having a cyclonic separator in communication with the grass clippings chamber; and
wherein the cyclonic separator is configured to remove dust particles from air circulating within the dust collection chamber.

10. The self-propelled mowing machine of claim 9 further comprising:
a fan attached to the mower housing for generating air flow to facilitate operation of the cyclonic separator.

11. The self-propelled mowing machine of claim 9 wherein the grassbag apparatus is positioned above the cutting element.

12. A self-propelled mowing machine comprising:
a mower housing having front, rear, upper and lower portions;
a handle attached to the rear upper portion of the mower housing;
an engine attached to the rear upper portion of the mower housing;
a variable speed transmission for propelling the self-propelled mowing machine; and
a grassbag apparatus for collecting grass clippings and removing dust particles from air within the grassbag apparatus, the grass bag apparatus being mountable to the mower housing; and
wherein the grassbag apparatus comprises:
a grass clippings chamber for collecting grass clippings from the mowing machine; and
a cyclonic separator in communication with the grass clippings chamber, and the cyclonic separator having a baffle for effectuating a cyclonic flow, wherein the cyclonic separator is configured for removing dust particles from air circulating within the cyclonic separator.

13. The self-propelled mowing machine of claim 12 further comprising:
a fan attached to the mower housing for generating air flow to facilitate operation of the cyclonic separator.

14. The self-propelled mowing machine of claim 12 wherein the grassbag apparatus is positioned above the mower housing.

15. The self-propelled mowing machine of claim 14 further comprising a second baffle positioned within the grass clippings chamber and surrounding the cyclonic separator to define a dust collection chamber.

16. The self-propelled mower machine of claim 15 wherein the second baffle comprises a plurality of slits for permitting air to enter the dust collection chamber while preventing grass clippings from entering therein.

17. The self-propelled mowing machine of claim 16 further comprising an air outlet integral with the baffle for removing substantially dust-free air from the grassbag apparatus by operation of the cyclonic separator.

18. A self-propelled mowing machine comprising:
- a mower housing having front, rear, upper and lower portions;
- a handle attached to the rear upper portion of the mower housing;
- an engine attached to the upper portion of the mower housing;
- a variable speed transmission for propelling the self-propelled mowing machine; and
- a grassbag apparatus for collecting grass clippings and removing dust particles from air within the grassbag apparatus, the grass bag apparatus being mountable to the mower housing; and
- wherein the grassbag apparatus comprises:
  - a grass clippings chamber for collecting grass clippings that are cut by the mowing machine;
  - a cyclonic separator in communication with the grass clippings chamber, and the cyclonic separator having a baffle for effectuating a cyclonic flow, wherein the cyclonic separator removes dust particles from air circulating within the cyclonic separator;
  - a channel connecting the grass clippings chamber to the cyclonic separator and wherein the channel has a first end that opens into the grass clippings chamber and a second end that opens into the cyclonic separator;
  - a debris screen positioned at the first end of the channel to prevent grass clippings from entering the channel and the cyclonic separator;
  - a dust collection receptacle for collecting dust that has been removed from the air by the cyclonic separator; and
  - an air outlet integral with the baffle for removing substantially dust-free air from the grassbag apparatus by operation of the cyclonic separator.

19. A method of removing dust particles from air circulating within a mowing machine comprising:
- drawing air containing grass clippings into a grassbag apparatus having a grass clippings chamber and a dust collection chamber, wherein the grassbag apparatus is mounted to the mower housing of a mowing machine;
- depositing grass clippings in the grass clippings chamber;
- separating dust particles from the air with a cyclonic separator positioned within the dust collection chamber and the cyclonic separator being operatively configured to the grass clippings chamber; and
- removing the substantially dust-free air from the grassbag apparatus via an air outlet.

20. The method according to claim 19 further comprising:
generating air flow with a fan attached to the mower housing to assist with facilitating operation of the cyclonic separator.

21. The method according to claim 19 further comprising:
collecting dust particles removed from the air by the cyclonic separator in a dust collection receptacle.

* * * * *